(12) United States Patent
Nejedly et al.

(10) Patent No.: US 11,635,093 B2
(45) Date of Patent: Apr. 25, 2023

(54) MOISTURE EVACUATION SYSTEM FOR ELECTRIC COMPRESSOR DEVICE

(71) Applicant: Garrett Transportation I Inc, Torrance, CA (US)

(72) Inventors: Milan Nejedly, Brno (CZ); Pavel Krejci, Brno (CZ); Daniel Turecek, Ostopovice (CZ); Vit Houst, Sestajovice (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 17/248,415

(22) Filed: Jan. 25, 2021

(65) Prior Publication Data
US 2022/0235799 A1    Jul. 28, 2022

(51) Int. Cl.
| | |
|---|---|
| F04D 29/70 | (2006.01) |
| F04D 25/06 | (2006.01) |
| F04D 29/28 | (2006.01) |
| F04D 29/42 | (2006.01) |
| F04D 29/62 | (2006.01) |
| F04D 15/00 | (2006.01) |

(52) U.S. Cl.
CPC ........... *F04D 29/706* (2013.01); *F04D 25/06* (2013.01); *F04D 29/284* (2013.01); *F04D 29/4206* (2013.01); *F04D 29/624* (2013.01); *F04D 15/0011* (2013.01)

(58) Field of Classification Search
CPC .... F04D 15/0011; F04D 25/06; F04D 29/284; F04D 29/4206; F04D 29/624; F04D 29/706
See application file for complete search history.

(56) References Cited

U.S. PATENT DOCUMENTS

| | | | | |
|---|---|---|---|---|
| 2,380,606 | A * | 7/1945 | Moody | ............ F04D 1/066 415/58.4 |
| 9,970,450 | B1 | 5/2018 | Kelly | |
| 10,473,110 | B2 | 11/2019 | Iizuka et al. | |

(Continued)

FOREIGN PATENT DOCUMENTS

| | | | |
|---|---|---|---|
| DE | 102016011543 A1 * | 3/2018 | |
| GB | 2508647 A | 6/2014 | |

(Continued)

*Primary Examiner* — Philip E Stimpert
(74) *Attorney, Agent, or Firm* — Lorenz & Kopf, LLP

(57) ABSTRACT

A compressor device includes a housing with a cavity. The compressor device includes a rotating group supported for rotation within the housing. The rotating group includes a shaft that supports a compressor wheel proximate a first end of the shaft. A second end of the shaft extends away from the compressor wheel through the cavity of the housing. The compressor device further includes a moisture evacuation system configured to remove airborne moisture from the compressor device. The moisture evacuation system includes a shaft passage extending through the second end of the shaft and a housing passage extending through an outer wall of the housing. The shaft passage is fluidly connected to the cavity. The housing passage is fluidly connected to the shaft passage. The moisture evacuation system is configured to direct the airborne moisture from the cavity, through the shaft passage, and out of the housing via the housing passage.

18 Claims, 3 Drawing Sheets

(56) References Cited

U.S. PATENT DOCUMENTS

2004/0219401 A1* 11/2004 Hobmeyr ............... F04D 29/706
                                                    429/415
2019/0211845 A1   7/2019  Iizuka et al.

FOREIGN PATENT DOCUMENTS

WO        2014210093 A1    12/2014
WO    WO-2019002322 A1 *    1/2019

* cited by examiner

MOISTURE EVACUATION SYSTEM FOR ELECTRIC COMPRESSOR DEVICE

TECHNICAL FIELD

The present disclosure generally relates to a compressor device and, more particularly, relates to a moisture evacuation system for an electric compressor device.

BACKGROUND

Various systems include a compressor device for supplying compressed fluid to a device. For example, engine systems can include at least one compressor device (e.g., an electric compressor, turbocharger, supercharger, or other related device) for compressing air that is fed to the engine. Fuel cell systems may also include one or more compressor devices for providing compressed air to a fuel cell stack. The compressor device can increase operating efficiency of these systems.

However, moisture in the fluid stream that is inlet into the compressor may detrimentally affect the compressor device. For example. in some embodiments, the compressor device may include an electric motor, and the moisture inlet into the compressor device may negatively affect the motor, the electronic control components for the motor, etc.

Thus, it is desirable to provide a compressor device that efficiently and effectively removes moisture flowing therethrough. Other desirable features and characteristics of the present disclosure will become apparent from the subsequent detailed description and the appended claims, taken in conjunction with the accompanying drawings and this background discussion.

BRIEF SUMMARY

In one embodiment, a compressor device is disclosed that includes a housing. The housing defines a cavity. The compressor device also includes a rotating group supported for rotation within the housing. The rotating group includes a shaft that supports a compressor wheel proximate a first end of the shaft. A second end of the shaft extends away from the compressor wheel through the cavity of the housing. The compressor device further includes a moisture evacuation system configured to remove airborne moisture from the compressor device. The moisture evacuation system includes a shaft passage extending through the second end of the shaft and a housing passage extending through an outer wall of the housing. The shaft passage is fluidly connected to the cavity. The housing passage is fluidly connected to the shaft passage. The moisture evacuation system is configured to direct the airborne moisture from the cavity, through the shaft passage, and out of the housing via the housing passage.

In another embodiment, a method of manufacturing a compressor device is disclosed. The method includes providing a rotating group that includes a compressor wheel on a first end of a shaft. A second end of the shaft extends away from the compressor wheel. The shaft includes a shaft passage that extends through the second end of the shaft. The method also includes providing a housing with a cavity, an outer wall, and a housing passage extending through the outer wall. Furthermore, the method includes supporting the rotating group in the housing with the second end of the shaft extending away from the compressor wheel through a cavity of the housing. Supporting the rotating group includes defining a moisture evacuation system configured to remove airborne moisture from the compressor device, including fluidly connecting the shaft passage to the cavity and fluidly connecting the housing passage to the shaft passage. The moisture evacuation system is configured to direct the airborne moisture from the cavity, through the shaft passage, and out of the housing via the housing passage.

In an additional embodiment, a fluid system is disclosed that is configured to compress a fluid supplied to a receiving device. The fluid system includes an upstream compressor device and a downstream compressor device. The fluid system also includes a valve having a first position and a second position. The fluid system with the valve in the first position provides a first flow path from the upstream compressor device to the downstream compressor device and then to the receiving device. The fluid system with the valve in the second position provides a second flow path from the upstream compressor device to the receiving device and that bypasses the downstream compressor device. The downstream compressor device includes a housing that defines a cavity. The downstream compressor device also includes a rotating group supported for rotation within the housing. The rotating group includes a shaft that supports a compressor wheel proximate a first end of the shaft. A second end of the shaft extends away from the compressor wheel through the cavity of the housing. Furthermore, the downstream compressor device includes a moisture evacuation system configured to remove airborne moisture from the compressor device. The moisture evacuation system includes a shaft passage extending through the second end of the shaft and a housing passage extending through an outer wall of the housing. The shaft passage is fluidly connected to the cavity, and the housing passage is fluidly connected to the shaft passage. The moisture evacuation system is configured to direct the airborne moisture from the cavity, through the shaft passage, and out of the housing via the housing passage.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a compressor device for a fluid system. The compressor device may include a moisture evacuation system configured to receive and remove airborne moisture from within the compressor device. In some embodiments, the compressor device may be a motorized e-compressor. The moisture evacuation system may route moisture away from an electric motor and/or electronic controls of the motorized e-compressor device. Accordingly, the moisture evacuation system protects moisture-sensitive components and increases the operating lifetime of the compressor device.

In some embodiments, the moisture evacuation system may include a shaft passage that extends through at least part of the shaft of the rotating group, and the moisture evacuation system may also include a corresponding housing passage that extends through the housing to establish a flow path from the internal cavity of the compressor device to the exterior of the compressor device. The shaft passage may be fluidly coupled to the internal cavity, and the housing passage may be fluidly coupled to the shaft passage and to the exterior. The fluid coupling between the shaft passage and the housing passage may ensure proper fluid flow while also allowing relative rotation between the shaft and the housing. Furthermore, in some embodiments, the moisture evacuation system may include at least one valve-like member for controlling fluid flow therethrough.

Methods of manufacturing the compressor device and manufacturing systems for the compressor device are also disclosed herein. Furthermore, embodiments of the present disclosure include fluid systems, compressor systems, engine systems, fuel cell systems, and other systems that incorporate a compressor device with a moisture evacuation system.

The moisture evacuation system may effectively remove moisture from airflow through the compressor device without negatively affecting operation. Also, the moisture evacuation system of the present disclosure may be incorporated without significantly increasing manufacturing costs or complexity.

Figure 1:
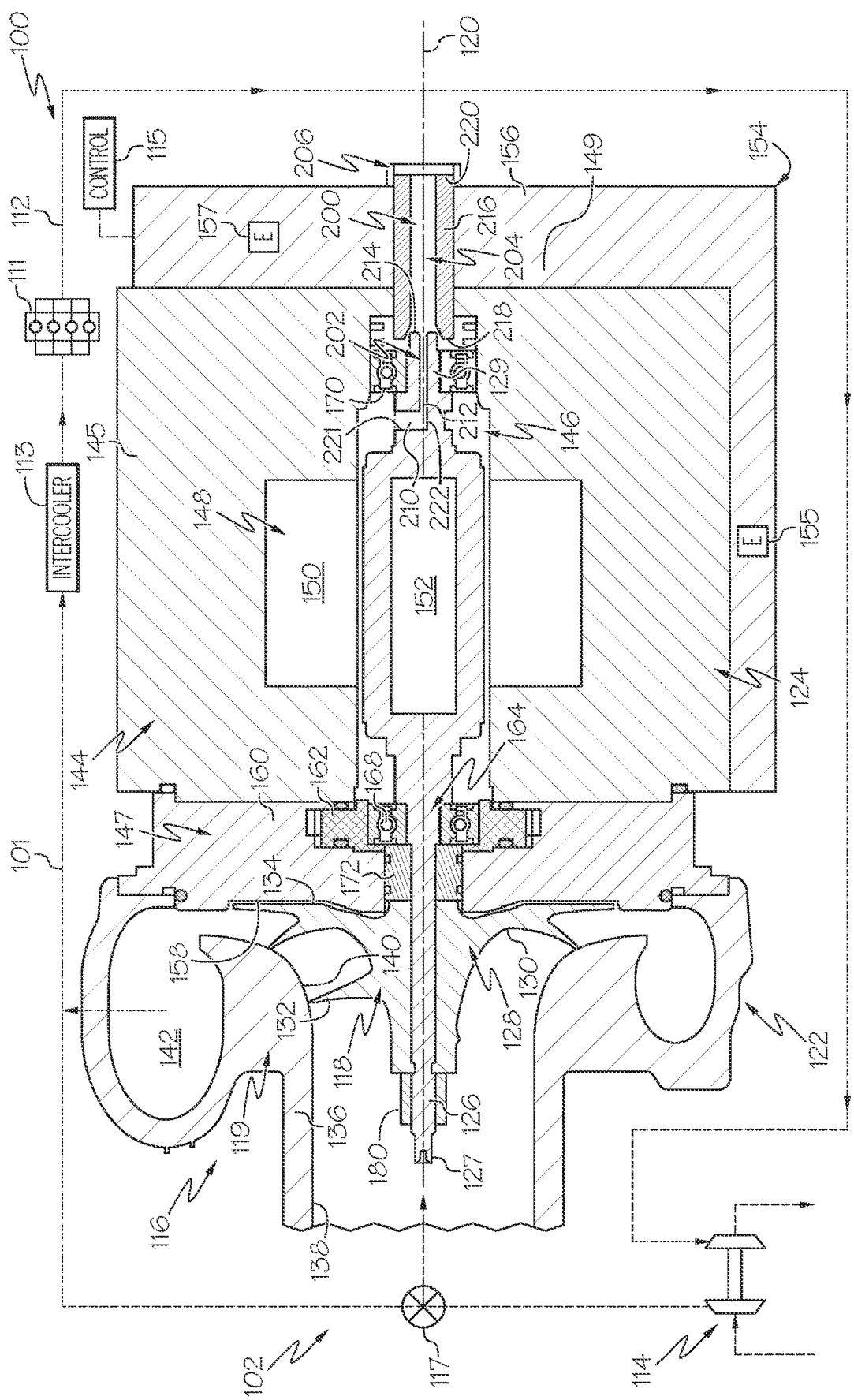
FIG. 1 is a schematic illustration of an engine system with an electric compressor device according to example embodiments of the present disclosure.

FIG. 1 is a schematic view of an engine system 100 with an associated fluid system 102 (i.e., an air intake and exhaust system). The fluid system 102 is configured to provide a compressed airstream (represented by arrow 101) to an internal combustion engine 111 (i.e., a receiving device) as will be discussed. The engine 111 may also provide an exhaust stream (represented by arrow 112) back to the fluid system 102.

In some embodiments, the engine system 100 and the fluid system 102 may be included in a vehicle, such as a car, truck, sport utility vehicle, van, motorcycle, etc. However, it will be appreciated that the engine system 100 and/or fluid system 102 may be configured for a different use without departing from the scope of the present disclosure. It will also be appreciated that the fluid system 102 may be adapted for a device other than an internal combustion engine. For example, the fluid system 102 may be operably coupled to a fuel cell stack for providing a compressed airstream thereto.

The fluid system 102 may include at least one boosting device, such as a compressor, turbocharger, supercharger, e-charger, etc., configured to provide the compressed airstream 101. In some embodiments, for example, the fluid system 102 may include a first (upstream) compressor device 114 and a second (downstream) compressor device 116. As represented in FIG. 1, the first compressor device 114 may be configured as a turbocharger, and the second compressor device 116 may be configured as an electric compressor device (i.e., electric supercharger, etc.). However, the first and/or second compressor devices 114, 116 may be configured differently without departing from the scope of the present disclosure.

The fluid system 102 may also include a valve 117. The valve 117 may be disposed between the compressor sections of the compressor devices 114, 116. More specifically, the valve 117 may be disposed between the outlet of the compressor section of the first compressor device 114 and the inlet of the second compressor device 116. The valve 117 may be moveable between a first position and a second position. In the first position (open position), the first and second compressor devices 114, 116 may be arranged in-series such that a first flow path is defined from the first compressor device 114, through the second compressor device 116, and then to the internal combustion engine 111. In the second position (closed position), the valve 117 may provide a second flow path from the first compressor device 114 to the internal combustion engine 111, bypassing the second compressor device 116.

The fluid system 102 may further include an intercooler 113. The intercooler 113 may be arranged upstream of the internal combustion engine 111 and may cool the compressed airstream 101 before it is received by the engine 111.

Various components of the engine system 100, the fluid system 102, the first compressor device 114, the second compressor device 116, and/or the valve 117 may be controlled by a control system 115. The control system 115 may be a computerized system with a processor, various sensors, and other control components. In some embodiments, the control system 115 may define or may be part of the electrical control unit (ECU) of a vehicle. The control system 115 may control the position of the valve 117 based on a variety of factors, such as engine speed of the engine 111.

During operation of the engine system 100, the control system 115 may move the valve 117 to the first position. Also, the compressor section of the first compressor device 114 may receive and compress air that is routed through the valve 117 to the second compressor device 116, which further compresses the airstream. This compressed airstream 101 may be supplied to the intercooler 113, which cools the airstream 101 before it is supplied to the engine 111. The fluid system 102 also routes the exhaust gas stream 112 of the engine 111 back to the turbine section of the first compressor device 114 for driving rotation thereof.

In other operating conditions, the control system 115 may move the valve 117 to the second position. Also, the compressor section of the first compressor device 114 may receive and compress air that is routed through the valve 117 to the intercooler 113 and further downstream to the engine 111. This compressed airstream 101 bypasses the second compressor device 116. Furthermore, the exhaust gas stream 112 is returned back to the turbine section of the first compressor device 114.

The airstream that is received by the second compressor device 116 may have significant moisture content (i.e., high humidity). When the valve 117 is in the first position, a relatively large volume of high-humidity air may move through the second compressor device 116. Also, with the valve 117 moving between the first and second positions, static pressure within the second compressor device 116 may provide some of this high-humidity air thereto. However, as will be discussed, the second compressor device 116 may include one or more features that receives, manages, and removes this moisture for protecting other components of the device 116 (e.g., electronic equipment, etc.).

Figure 2:
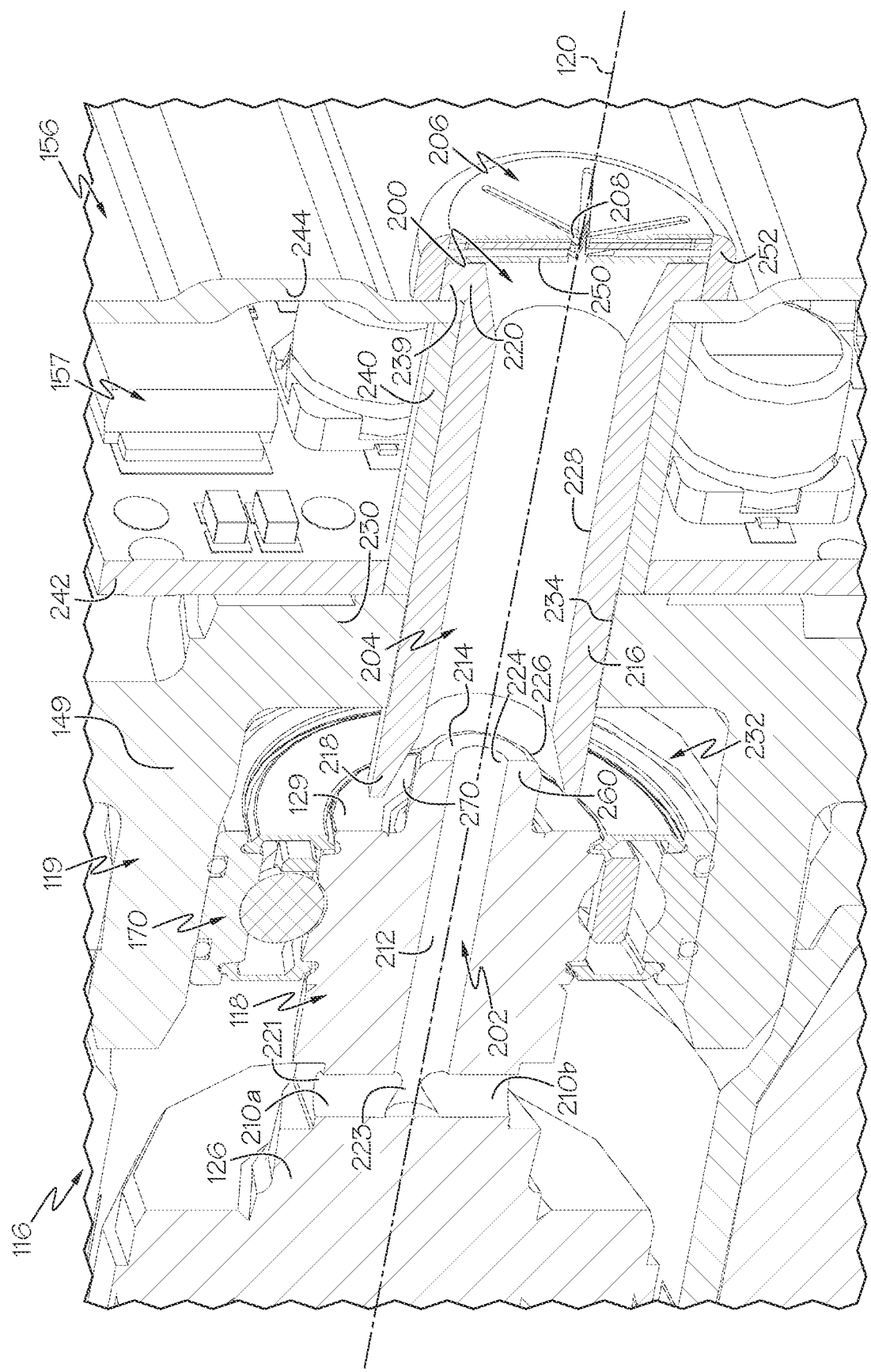
FIG. 2 is a perspective axial section view of part of the electric compressor device of FIG. 1 according to example embodiments of the present disclosure.

Referring now to FIGS. 1 and 2, the second compressor device 116 will be discussed in greater detail according to example embodiments. The compressor device 116 may generally include a rotating group 118 and a housing 119. The rotating group 118 is supported for rotation about an axis 120 within the housing 119. Also, in some embodiments, the compressor device 116 may define a compressor section 122 and a motor section 124.

The rotating group 118 may include an elongate shaft 126 that extends along the axis 120 between the compressor section 122 and the motor section 124. The shaft 126 may be centered on the axis 120. The shaft 126 may include a first end 127 (FIG. 1) and a second end 129 (FIGS. 1 and 2).

As shown in FIG. 1, the rotating group 118 may also include a compressor wheel 128. The compressor wheel 128 may have a front face 130 that is generally frusto-conic and that includes a plurality of blades 132 that project therefrom. The blades 132 may also extend helically about the axis 120 along the front face 130. The compressor wheel 128 may also have a back face 134 that is substantially flat and smooth and that extends radially with respect to the axis 120. The compressor wheel 128 may be fixed proximate the first end 127 of the shaft 126 to be supported thereon. The second end 129 may extend away from the compressor wheel 128 along the axis 120.

The compressor wheel 128 may be supported within a compressor housing 136 of the housing 119. The compressor housing 136 may include a hollow, tubular inlet 138, a contoured internal surface 140, and a volute or scroll-shaped outlet 142. The inlet 138 may be centered and directed along the axis 120. The outlet 142 may extend about the axis 120. The internal surface 140 may be gradually contoured between the inlet 138 and the outlet 142. The compressor wheel 128 may be received within the compressor housing 136 with the front face 130 and blades 132 opposing the internal surface 140. Accordingly, the compressor wheel 128 and the compressor housing 136 may cooperatively define the compressor section 122 of the compressor device 116.

The housing 119 may also include a motor housing 144. The motor housing 144 may include one or more strong and robust parts that define at least one internal cavity 146 therein. As schematically represented in FIG. 1, the motor housing 144 may include an outer radial portion 145, a first axial end portion 147 (first axial end wall, barrier, member, etc.), and a second axial end portion 149 (second axial end wall, barrier, member, etc.). The outer radial portion 145 may extend about the axis 120, and the first and second axial end portions 147, 149 may extend radially on opposite sides of the motor section 124. It will be appreciated that one or more of the portions 145, 147, 149 of the motor housing 144 may include a plurality of individual parts. The shaft 126 may be received within and may extend through the internal cavity 146 of the motor housing 144.

The compressor device 116 may further include an electric motor 148. The electric motor 148 may include a stator 150 that is fixedly supported within the internal cavity 146 of the motor housing 144. The electric motor 148 may also include a rotor member 152, which is supported on the shaft 126 of the rotating group 118. The motor 148 may selectively drive rotation of the rotating group 118 about the axis 120 (i.e., the axis of rotation).

The housing 119 may further include at least one control panel 154 (FIG. 1) that is mounted on and supported by the motor housing 144. The control panel 154 may include electronic components for control of the electric motor 148. For example, the control panel 154 may include one or more circuit board assemblies that are housed within a respective control housing 156. For example, as represented in FIG. 1, the control housing 156 may include portions that are fixed to the longitudinal end of the compressor device 116 (on the longitudinal end opposite the compressor section 122). Also, as represented in the example of FIG. 1, the control housing 156 may include portions that are fixed to the radial side of the motor housing 144. The control panel 154 may also include first electronic components 155 (e.g., one or more circuit board assemblies, etc.) disposed on the radial side and/or second electronic components 157 disposed on the longitudinal end of the compressor device 116. The electronic components 155, 157 may be in communication with the control system 115 of the system 100. Accordingly, the control system 115 may control speed, acceleration, and other operating conditions of the motor 148 for selectively controlling operations of the system 100.

In the compressor section 122, the shaft 126 may extend through the first axial end portion 147 of the motor housing 144 and into the compressor housing 136. Also, the compressor housing 136 may be fixedly attached to the first axial end portion 147 to cover over the front face 130 of the compressor wheel 128. The back face 134 of the compressor wheel 128 may face toward a radially-extending surface 158 of the axial end portion 147 of the housing 119. Accordingly, the axial end portion 147 may be longitudinally disposed between the back face 134 of the compressor wheel 128 and the motor 148.

In some embodiments, the first axial end portion 147 of the motor housing 144 may be cooperatively defined by a plurality of parts. For example, the first axial end portion 147 may include a cap member 160 and an inner ring 162. The cap member 160 may be plate-like, and the ring 162 may be generally annular in shape. The cap member 160 and ring 162 may cooperatively define a central opening 164 of the axial end portion 147 through which the shaft 126 extends. The cap member 160 may be fixed on one side to the outer radial portion 145 of the motor housing 144 and fixed on the opposite side to the compressor housing 136. The inner ring 162 may be fixed and received within an inner radial area of the cap member 160 on the side facing the motor 148.

The compressor device 116 may additionally include one or more bearings 168, 170. The bearing(s) 168, 170 may be roller element bearings as represented in FIGS. 1 and 2. However, it will be appreciated that the compressor device 116 may include air bearings or other types of bearings without departing from the scope of the present disclosure.

In some embodiments, the compressor device 116 may include a first bearing 168 (i.e., a front bearing), which supports the first end 127 of the shaft 126, and which is received within the central opening 164. More specifically, an outer radial portion (e.g., an outer race) of the first bearing 168 may be attached to the inner ring 162 of the axial end portion 147, and the inner radial portion (e.g., an inner race) of the first bearing 168 may be attached to the shaft 126.

As shown in FIGS. 1 and 2, the compressor device 116 may also include a second bearing 170 (i.e., a rear bearing). The second bearing 170 may support the second end 129 of the shaft 126. More specifically, an outer radial portion (e.g., an outer race) of the second bearing 170 may be attached to an inner surface of the second axial end portion 149 of the motor housing 144, and the inner radial portion (e.g., an inner race) of the second bearing 170 may be attached to the second end 129 of the shaft 126.

Furthermore, the compressor device 116 may include a spacer 172. The spacer 172 may be generally annular, spool-shaped, tubular, cylindrical, etc. The spacer 172 may be received on the shaft 126, longitudinally between the compressor wheel 128 and the first bearing 168. Also, the spacer 172 may be received within the central opening 164 with its outer radial surface facing an inner radial surface of the cap member 160 of the axial end portion 147. One axial end of the spacer 172 may abut against the hub area of the back face 134 of the compressor wheel 128. The opposite axial end of the spacer 172 may abut against the inner race of the first bearing 168.

The rotating group 118 may also include an end fastener 180 that is attached to the shaft 126 and that fixedly attaches the components of the rotating group 118 on the shaft 126. The spacer 172 maintains longitudinal spacing between the compressor wheel 128 and the bearing 168 in this assembled arrangement.

Moreover, the compressor device 116 may include a moisture evacuation system 200. The moisture evacuation system 200 may be configured for removing airborne moisture from the compressor device 116. For example, the compressor device 116 may receive relatively humid air from the compressor device 114 (FIG. 1). A portion of this air may flow into the internal cavity 146. The moisture evacuation system 200 may route this air and the moisture contained therein from the compressor device 116.

In some embodiments, the moisture evacuation system 200 may generally include a shaft passage 202 and a housing passage 204. The shaft passage 202 may be in fluid communication with the cavity 146 of the housing 119 and may extend through at least part of the shaft 126. The housing passage 204 may be in fluid communication with the shaft passage 202 and may extend through an outer wall of the housing 119. Thus, humid air within the cavity 146 may flow via the shaft passage 202 and out of the compressor device 116 via the housing passage 204.

For example, as shown in FIGS. 1 and 2, the shaft passage 202 may extend, at least, through the second end 129 of the shaft 126. Also, the housing passage 204 may extend through the second axial end portion 149 of the housing 119. At least a part of the shaft passage 202 may be aligned (e.g., along the axis 120) to provide effective fluid communication therebetween, while also allowing rotation of the shaft 126 relative to the housing 119. More specifically, in some embodiments, at least part of the shaft passage 202 and at least part of the housing passage 204 may be centered about the axis 120. Also, terminal ends of the shaft passage 202 and housing passage 204 may be in close proximity and substantially aligned along the axis 120.

As shown in FIG. 1, the shaft passage 202 may include at least one radial segment 210. In FIG. 1, a single radial segment 210 is shown; however, the shaft passage 202 may include a plurality of radial segments (e.g., a first radial segment 210a and a second radial segment 210b), which are spaced apart about the axis 120 (e.g., approximately 180° apart). For purposes of discussion, the radial segment 210 will be discussed below with the understanding that the features may apply to individual ones or to multiple ones of the radial segments 210a, 210b. The radial segment 210 may have a rounded (e.g., circular) cross section. The radial segment 210 may extend radially from the outer surface (the outer radial surface) of the shaft 126 radially inward. In some embodiments, the radial segment 210 may have a straight axis that intersects the axis 120. Also, the radial segment 210 may extend normal to the axis 120. The radial segment 210 may be a machined hole that is formed via a machining process (e.g., drilling). The radial segment 210 may define an inlet 221 of the shaft passage 202 and may terminate at an internal end 223.

The shaft passage 202 may further include at least one axial segment 212. As shown in FIGS. 1 and 2, the axial segment 212 may extend along the axis 120 from the internal end 222 of the radial segment 210 to a terminal end 214 of the shaft 126. In some embodiments, the terminal end 214 may be included on a projecting, axial nub 260 of the shaft 126. The axial segment 212 may have a straight axis and may be centered on the rotational axis 120 of the rotating group 118. The axial segment 212 may have a rounded (e.g., circular) cross section. The axial segment 212 may be a machined hole that is formed in the shaft 126 via a machining process (e.g., drilling). The axial segment 212 may define an outlet 224 of the shaft passage 202 that extends through the terminal end 214 of the shaft 126. The terminal end 214 may have an outer edge 226 that is rounded, beveled, broken, convex, or otherwise smoothly shaped about its circumference.

Accordingly, the inlet 221 of the shaft passage 202 may be disposed longitudinally between the electric motor 148 and the second bearing 170. The inlet 221 and the outlet 224 of the shaft passage 202 may be disposed on opposite sides of the bearing 170. The shaft passage 202 may also reduce air and moisture interaction with the second bearing 170 for added benefit.

As such, the shaft passage 202 may be included for effectively moving fluid from the internal cavity 146 of the compressor device 116 to the housing passage 204. The shaft passage 202 may be included without detrimentally effecting the strength or other characteristics of the shaft 126. Also, the shaft passage 202 may be incorporated and manufactured in an efficient manner.

Furthermore, the compressor device 116 may include a tube 216, which largely defines the housing passage 204. The tube 216 may be hollow and axially straight, extending between a first end 218 and a second end 220. The tube 216 may have a circular cross section and may define an inner diameter surface 228 that defines the housing passage 204. The inner diameter surface 228 may be flared outward radially at the first end 218 and at the second end 220. The second end 220 may include a radially-outward extending lip 239. The first end 218 may define the inlet of the housing passage 204, and the second end 220 may define the outlet of the housing passage 204.

The tube 216 may be received within and may extend through the axial end portion 149 (an outer wall) of the housing 119. For example, as shown in FIG. 2, the axial end portion 149 may be cooperatively defined by an end pocket wall 230 of the motor housing 144 and the control housing 156, and the tube 216 may be received in and may extend through both the pocket wall 230 and the control housing 156. As shown in FIG. 2, the end pocket wall 230 may be a wall that extends normal to the axis and that defines a pocket 232 for receiving the bearing 170 and the terminal end 214 of the shaft 126. The end pocket wall 230 may include a circular through-hole 234 for receiving the tube 216. The first end 218 of the tube 216 may project inwardly from the pocket wall 230. The control housing 156 may include a stand-off 240 that separates an inner panel 242 and an outer panel 244. The inner panel 242 may support the electronic components 157 (e.g., circuit board assembly, etc.) and may be abutted against the outer surface of the pocket wall 230. The outer panel 244 may define an exterior surface of the compressor device 116. The tube 216 may be received within the stand-off 240. The lip 239 of the tube 216 may abut against the exterior surface of the outer panel 244. Thus, the second end 220 of the tube 216 may project axially outward from surrounding areas of the housing 156, and the first end 218 may project axially inward from surrounding areas of the pocket wall 230.

The first end 218 of the tube 216 may be coupled to the second end 129 of the shaft 126 to provide fluid communication between the shaft passage 202 and the housing passage 204 and to allow relative rotation between the shaft 126 and housing 119. One of the tube 216 and the second end 129 of the shaft 126 may receive the other. For example, as shown in the illustrated embodiments, the first end 218 of the tube 216 may receive the nub 260 of the shaft 126. In other words, there may be longitudinal overlap of the tube 216 over the nub 260. The flared profile of the first end 218 may substantially correspond to the shape of the nub 260 such that there is a small, substantially conic gap 270 defined therebetween.

Thus, the tube 216 may effectively receive and remove airborne moisture received from the shaft passage 202. The tube 216 may isolate and protect the electronic components 157 from moisture exposure. Furthermore, the tube 216 may provide stiffness to the control housing 156 to further protect the electronic components 157.

Moreover, in some embodiments, the moisture evacuation system 200 may include a vent covering 206. The vent covering 206 may extend across the housing passage 204 and may limit or otherwise control flow therethrough. The vent covering 206 may include at least one aperture 208. In some embodiments, the vent covering 206 may include one or more layers of a thin, disc-like membrane 250. The membranes 250 may be made of a polymeric material. The membranes 250 may be a breathable fabric membrane. In additional embodiments, the membrane 250 may include a silica gel or other desiccant.

As shown in FIG. 2, there may be a plurality of membranes 250 that are layered over each other in the axial direction. The vent covering 206 may also include an outer rim 252 that extends about the outer radial edges of the membranes 250 and that attaches the membranes 250 to the lip 239. In some embodiments, the rim 252 of the vent covering 206 receives the lip 239 such that the membranes 250 extend across (e.g., normal) the housing passage 204 at the outlet thereof. In some embodiments, the aperture 208 may include slits through the thickness of the membranes 250. These slits may be arranged in a pattern that radiates from the axis 120. In some embodiments, the material of the membranes 250 may be resiliently flexible. For example, pressure within the compressor device 116 may cause air (and moisture contained therein) to resiliently flex and open the aperture 208, whereas ambient pressure outside the compressor device 116 may be insufficient for opening the aperture 208. Thus, the vent covering 206 may be a one-way aperture (one-way valve) that allows for passage of the airborne moisture in a single direction (outward) and that substantially prevents flow inward into the compressor device 116. Additionally, where the membrane 250 is a breathable fabric, the aperture 208 may be pores or other openings defined between knitted or woven threads that provide flow in one direction (egress direction) and that block flow in the other direction (ingress direction). Furthermore, in some embodiments, a drainage hose or other fluid line may be attached at the outlet of the housing passage 204.

Accordingly, during operation of the compressor device 116, some air may flow from between the back face 134 of the compressor wheel 128 and the axial end portion 147 of the motor housing 144. This air flow may be directed axially along the spacer 172, through the bearing 168, and into the cavity 146. This air may contain a substantial amount of moisture in some conditions. However, the airborne moisture may flow through the moisture evacuation system 200. The humid air may flow from the cavity 146 and into the shaft passage 202 via the radial segment 210 and downstream into the axial segment 212. This air may move through the housing 119 via the tube and 216 out of the compressor device 116 via the aperture 208 in the vent covering 206.

Thus, the moisture evacuation system 200 may protect the motor 148, the electronic components 155, 157, etc. from moisture exposure. This may extend the operating lifetime of the compressor device 116.

Furthermore, the compressor device 116 may be manufactured efficiently and at low cost. The moisture evacuation system 200 may be incorporated using efficient methods (e.g., drilling the shaft passage 202) and by including relatively few parts (e.g., the tube 216 and the vent covering 206). As an added benefit, pressure on both side of the bearing 170 may be substantially balanced due to the configuration of the moisture evacuation system 200. Thus, assembly and further manufacture can be completed in a highly efficient manner.

Figure 3:
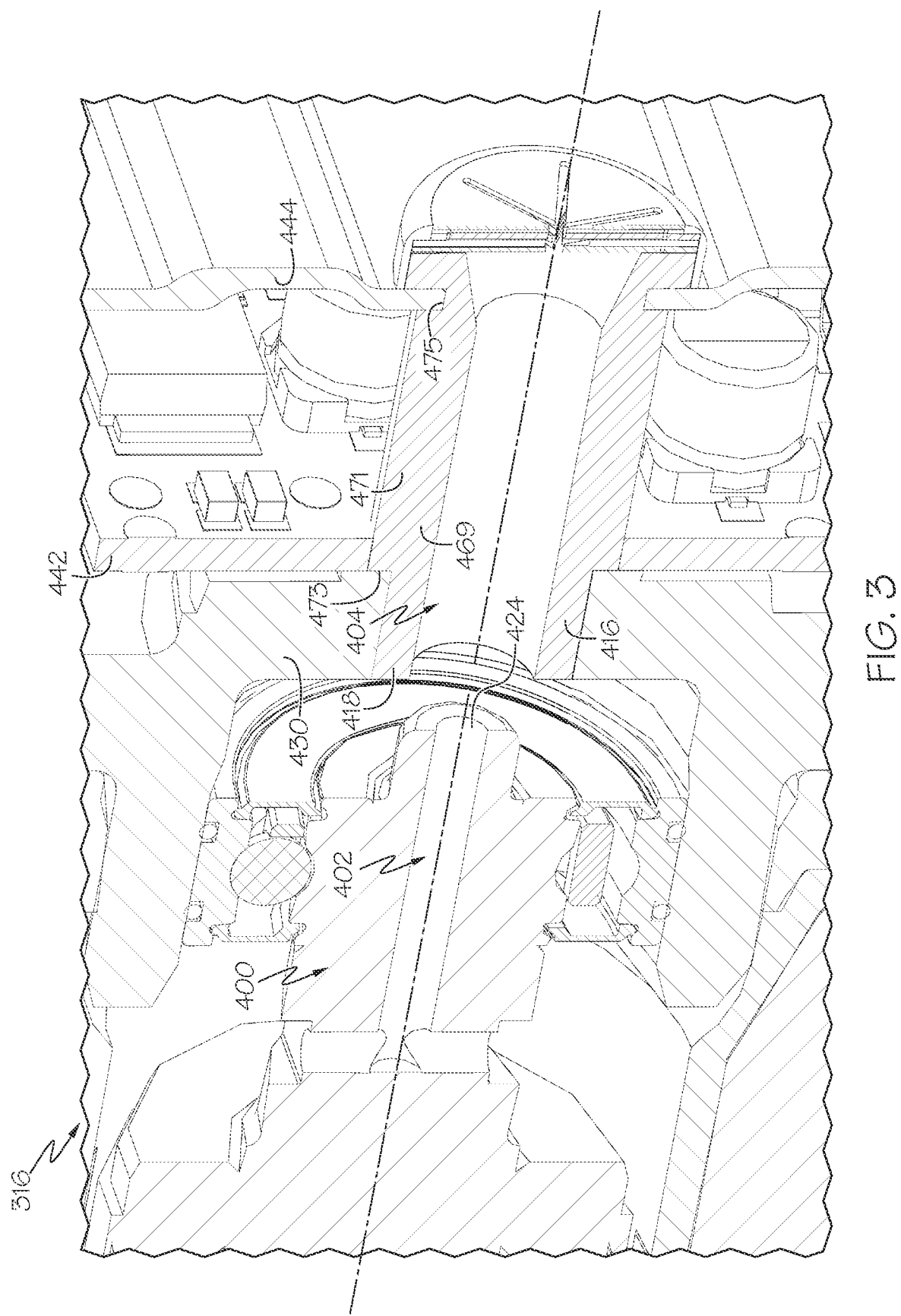
FIG. 3 is a perspective axial section view of the electric compressor device of FIG. 1 according to additional example embodiments of the present disclosure.

Referring now to FIG. 3, additional example embodiments of the compressor device 316 will be discussed. The compressor device 316 may include similar features to those discussed above with relation to FIGS. 1-2 except as noted. Components that correspond to those of FIGS. 1-2 will be identified with corresponding reference numbers increased by 200.

As shown in FIG. 3, the moisture evacuation system 400 may be similar to those discussed above. As such, the moisture evacuation system 400 may include a shaft passage 402 and a housing passage 404. The shaft passage 402 may be similar to the embodiments discussed above. However, the housing passage 404 may be configured according to additional embodiments.

As shown, the first end 418 of the tube 416 may be substantially flush with the inner side of the pocket wall 430 (instead of projecting inwardly as the embodiments of FIG. 2). The first end 418 may be close enough and proximate to the outlet 424 of the shaft passage 402 to establish the fluid connection and to receive airflow therefrom.

Also, the tube 416 may include an inner radial portion 469 and an outer radial portion 471. In some embodiments, the tube 416 may be a unitary, one-piece part that defines the inner and outer radial portions 469, 471. In other words, the inner and outer radial portions 469, 471 may be integrally connected. A radially projecting shoulder 473 may be defined on the tube 416 at the transition between the inner and outer radial portions 469, 471. The shoulder 473 may abut against the pocket wall 430. Also, the tube 416 may include an undercut groove 475 that receives the outer panel 444. Thus, the tube 416 may engage both the inner panel 442 and the outer panel 444, and the tube 416 may be configured as a stand-off that maintains axial separation between the panels 442, 444. In other words, the tube 416 may be a one-piece member that routes moisture out of the compressor device 316 via the passage 404, that provides stiffness for maintaining separation between the inner panel 442 and the outer panel 444, and that maintains separation between the outer panel 444 and the pocket wall 430.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A compressor device comprising:
a housing that defines a cavity;
a rotating group supported for rotation within the housing, the rotating group including a shaft;
a compressor section comprising a compressor wheel of the rotating group and a compressor housing of the housing that houses the compressor wheel, the compressor wheel including a back face that faces away from the compressor section;
the compressor wheel being proximate a first end of the shaft, a second end of the shaft extending away from the back face of the compressor wheel through the cavity of the housing; and
a moisture evacuation system configured to remove airborne moisture from the compressor device, the moisture evacuation system including a shaft passage extending through the second end of the shaft and a housing passage extending through an outer wall of the housing, the shaft passage including an inlet into the shaft passage that is fluidly connected to the cavity and an outlet from the shaft passage that extends through a terminal axial face of the second end of the shaft, and the housing passage being fluidly connected to the outlet of the shaft passage, the moisture evacuation system configured to direct the airborne moisture from the cavity, through the shaft passage from the inlet to the outlet, and out of the housing via the housing passage
wherein the rotating group is supported for rotation about an axis within the housing; and
wherein the shaft passage includes at least one radial segment that is disposed axially with respect to the axis between the back face of the compressor wheel and the terminal axial face, the at least one radial segment including the inlet and extending radially with respect to the axis.

2. The compressor device of claim 1, wherein the rotating group is supported for rotation about an axis within the housing, and wherein the outlet of the shaft passage and at least part of the housing passage are aligned and substantially centered along the axis.

3. The compressor device of claim 1, further comprising a vent covering that extends across the housing passage to limit flow therethrough.

4. The compressor device of claim 3, wherein the vent covering includes a one-way aperture that allows for passage of the airborne moisture in a single direction.

5. The compressor device of claim 3, wherein the vent covering is a resiliently flexible membrane.

6. The compressor device of claim 1, wherein the shaft passage includes an axial segment that is centered on the axis;
wherein the axial segment is fluidly connected to the at least one radial segment; and
wherein the axial segment includes the outlet that is fluidly connected to the housing passage.

7. The compressor device of claim 1, further comprising an electric motor configured to drive the rotating group in rotation;
wherein the housing includes a control housing that houses electronic components of the electric motor;
further comprising a hollow tube that defines the housing passage; and
wherein the hollow tube extends through the control housing.

8. The compressor device of claim 1, further comprising a hollow tube that defines the housing passage, wherein one of the hollow tube and the second end of the shaft receives the other.

9. The compressor device of claim 8, wherein the hollow tube receives the second end of the shaft.

10. The compressor device of claim 8, wherein the housing includes an inner panel and an outer panel; and
wherein the hollow tube extends through the inner panel and the outer panel; and
wherein the hollow tube is engaged to the inner and the outer panel to maintain separation between the inner panel and the outer panel.

11. The compressor device of claim 1, further comprising a bearing that supports the rotating group for rotating within the housing about an axis, the bearing including rolling elements;
wherein the inlet and the outlet are spaced on opposite axial sides of the bearing.

12. A method of manufacturing a compressor device comprising:
providing a rotating group that includes a compressor wheel proximate a first end of a shaft, the compressor wheel including a back face, a second end of the shaft extending away from the back face of the compressor wheel, the shaft including a shaft passage that extends through the second end of the shaft, the shaft passage including an inlet into the shaft passage and an outlet from the shaft passage that extends through a terminal axial face of the second end of the shaft;
providing a housing with a cavity, an outer wall, and a housing passage extending through the outer wall; and
supporting the rotating group for rotation in the housing to define a compressor section, the back face facing away from the compressor section, the compressor section comprising the compressor wheel and a compressor housing of the housing that houses the compressor wheel, the second end of the shaft extending away from the back face of the compressor wheel through the cavity of the housing; and
defining a moisture evacuation system configured to remove airborne moisture from the compressor device, including fluidly connecting the inlet of the shaft passage to the cavity and fluidly connecting the outlet of the shaft passage to the housing passage, the moisture evacuation system configured to direct the airborne moisture from the cavity, through the shaft passage from the inlet to the outlet, and out of the housing via the housing passage
wherein supporting the rotating group in the housing includes supporting the rotating group for rotation about an axis;
wherein the shaft passage includes at least one radial segment that includes the inlet and that is fluidly connected to the cavity;
wherein the shaft passage includes an axial segment that includes the outlet and that is centered on the axis;
wherein the axial segment is fluidly connected to the at least one radial segment; and
wherein the axial segment is fluidly connected to the housing passage.

13. The method of claim 12, further comprising covering the housing passage with a vent covering configured to limit flow through the housing passage.

14. The method of claim 12, wherein providing the housing includes centering the housing passage on the axis.

15. The method of claim 12, further comprising housing an electric motor within the housing, the electric motor configured to drive the rotating group in rotation, wherein the housing includes a control housing that houses electronic components of the electric motor, and wherein the housing passage extends through the control housing.

16. The method of claim 12, further comprising receiving the second end of the shaft within the housing passage.

17. A fluid system configured to compress a fluid supplied to a receiving device comprising:
- an upstream compressor device;
- a downstream compressor device;
- a valve having a first position and a second position, the fluid system with the valve in the first position providing a first flow path from the upstream compressor device to the downstream compressor device and then to the receiving device, the fluid system with the valve in the second position providing a second flow path from the upstream compressor device to the receiving device that bypasses the downstream compressor device;
- the downstream compressor device comprising:
  - a housing that defines a cavity;
  - a rotating group supported for rotation within the housing, the rotating group including a shaft;
  - a compressor section comprising a compressor wheel of the rotating group and a compressor housing of the housing that houses the compressor wheel, the compressor wheel including a back face that faces away from the compressor section;
  - the compressor section being proximate a first end of the shaft, a second end of the shaft extending away from the back face of the compressor wheel through the cavity of the housing; and
  - a moisture evacuation system configured to remove airborne moisture from the compressor device, the moisture evacuation system including a shaft passage extending through the second end of the shaft and a housing passage extending through an outer wall of the housing, the shaft passage including an inlet extending radially into the shaft passage that is fluidly connected to the cavity and an outlet from the shaft passage that extends through a terminal axial face of the second end of the shaft, and the housing passage being fluidly connected to outlet of the shaft passage, the moisture evacuation system configured to direct the airborne moisture from the cavity, through the shaft passage from the inlet to the outlet, and out of the housing via the housing passage.

18. The compressor device of claim 8, wherein the housing includes a wall, the hollow tube projecting into the cavity from the wall, one of the hollow tube and the second end of the shaft receiving the other.

\* \* \* \* \*